United States Patent [11] 3,611,421

[72] Inventor Luc P. Benoit
Los Angeles, Calif.
[21] Appl. No. 821,394
[22] Filed May 2, 1969
[45] Patented Oct. 5, 1971
[73] Assignee Bell & Howell Company
Chicago, Ill.

[54] RECORDING BY VARYING THE LOCATION OF A MAGNETIC SPOT
21 Claims, 5 Drawing Figs.

[52] U.S. Cl. ......... 346/74 MT, 179/100.2 CR
[51] Int. Cl. ......... H01v 3/04
[50] Field of Search ......... 346/74 MT; 179/100.2 CF, 100.2 CR; 250/65 T; 340/174 YC; 161/410, 412; 117/37.5, 235

[56] References Cited
UNITED STATES PATENTS

| | | | |
|---|---|---|---|
| 3,250,636 | 5/1966 | Wilferth | 346/74 X |
| 3,391,254 | 7/1968 | Honig | 179/100.2 |
| 3,453,646 | 7/1969 | Speliotis et al. | 346/74 |

*Primary Examiner*—Bernard Konick
*Assistant Examiner*—Gary M. Hoffman
*Attorney*—Raymond A. Andrew

ABSTRACT: Methods and apparatus for displaying information in which a magnetic spot having a substantially predetermined configuration is shifted in a magnetic recording medium as a magnetic spot having that predetermined configuration and in response to the information to be displayed, and in which such variations of the magnetic spot are rendered visible or are printed out on a sheet of paper.

INVENTOR.
Luc P. Benoit

INVENTOR.
Luc P. Benoit

RECORDING BY VARYING THE LOCATION OF A MAGNETIC SPOT

RELATED APPLICATIONS

Subject matter of the present disclosure is related to subject matter disclosed in the following patent applications, the contents of which are herewith incorporated herein by reference:

Ser. No. 821,232, Magnetic Information Recording, filed of even date herewith, by the present inventor, and assigned to the present assignee;

Ser. No. 821,232, Magnetic Information Recording, filed of even date herewith, by the present inventor, and assigned to the present assignee.

BACKGROUND OF THE INVENTION

1. Field of the Invention

The subject invention relates to methods and apparatus for displaying information and, more particularly, to methods and apparatus for exploiting thermoremanent magnetization techniques in the display of information.

2. Prior Art

There are numerous proposals for providing a magnetized trace of variable input information on a medium on which such trace may be rendered visible or from which such trace may be printed out on a sheet of paper. However, there still persists a need for a magnetic counterpart of the cathode-ray oscillograph tube in which a luminous spot or an electrically charged spot travels across a screen for a display or preparatory to a printout of input information.

Obviously such a magnetic counterpart would have many applications in the information display and recording arts. For practical reasons, however, , and without limiting intent, the subject disclosure is primarily written with reference to the field of oscillography.

In that field, the need for inexpensive printout media is particularly felt in view of the ever-increasing printout speeds that are required of modern oscillography techniques.

A promising approach is apparent from proposals to provide magnetic traces of the input information. These proposals are attractive because they point the way to the utilization of inexpensive printout paper on which the magnetic traces are printed out by a magnetic toner or another magnetic printout agent.

Prior art magnetic oscillographs suffer, however, from the fact that they either provide only relatively faint magnetic traces, or that they require rotating drum structures for a provision of the magnetic trace.

SUMMARY OF THE INVENTION

The subject invention meets the above-mentioned needs by providing methods and apparatus for the display of information as hereinafter defined. According to the subject invention a magnetic recording medium is provided. A magnetic spot having a substantially predetermined configuration is provided in said magnetic recording medium. The location of the magnetic spot having that predetermined configuration is varied in response to the information to be displayed, and the resulting variations of the magnetic spot are rendered visible. These methods and apparatus are to be distinguished from those in which a magnetic trace is provided. According to the subject invention the are magnetic spot travels as a spot, rather than being extended into a trace.

The expression "displaying information" as used herein is intended to be broad enough to cover also information recording or information printout.

BRIEF DESCRIPTION OF THE DRAWINGS

The invention and its various aspects will become more readily apparent from the following detailed description of preferred embodiments thereof, illustrated by way of example in the accompanying drawings, in which.

DESCRIPTION OF PREFERRED EMBODIMENTS

Figure 1:
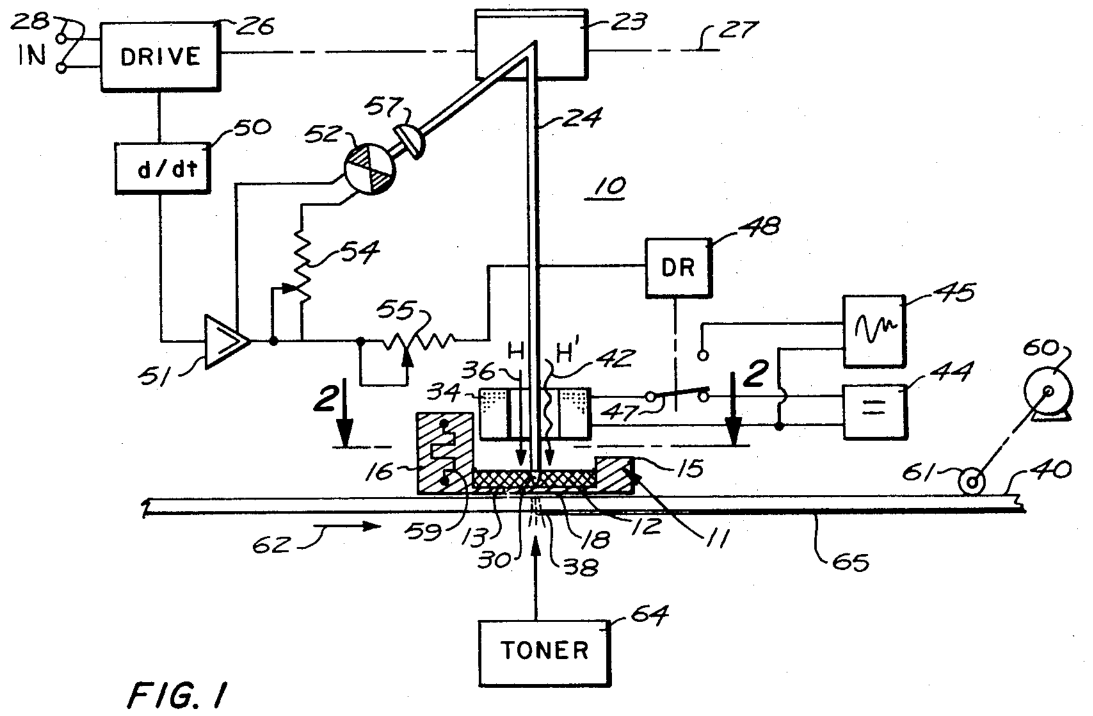
FIG. 1 is a diagrammatic illustration, partially in section, of a recording oscillograph in accordance with a first preferred embodiment of the invention.

The recording oscillograph 10 of FIG. 1 includes a relatively stationary mount 11 for a magnetic recording medium 12.

Suitable recording media include the thermomagnetic recording media described, for instance, in British Pat. No. 1,139,232, Improvement relating to Thermomagnetic Recording, published Jan. 8, 1969, and filed by E. I. du Pont de Nemours and Company, and the thermomagnetic recording media described in the copending U.S. Pat. No. 3,541,577 by James U. Lemke, issued Nov. 17, 1970, and assigned to the assignee of the subject application. Typically, these media include a supporting base which is preferably made of a high-temperature plastic material, and a coating which contains particles of a low-Curie point medium, such as chromium dioxide, and which is deposited on the supporting base.

As has been disclosed in the latter Lemke application, the magnetic particles in the coating preferably have a quality of anisotropy, such as shape anisotropy, which dominates their crystal anisotropy so as to impart on the recording medium an acute coercivity and remanence curve in the vicinity of the Curie point.

If desired, the light sensitivity of the thermomagnetic medium may be considerably increased by a combination thereof with a photoconductor which converts and incoming luminous image into a thermal image that will bring about the desired thermomagnetic effect. Photosensitive magnetic recording media of this type are disclosed in the copending U.S. Pat. application Ser. No. 756,942, Magnetic Imaging, filed Sept. 3, 1968, by Joseph Gaynor and James U. Lemke, and assigned to the assignee of the subject application.

For the purpose of simplicity, the subject application merely shows a one-stratum thermomagnetic recording medium 12, with the understanding however, that this one-stratum representation is intended to cover thermomagnetic recording media in general, and thermomagnetic recording media of the type disclosed in the aforesaid British patent, the aforesaid Lemke patent copending Gaynor and Lemke patent applications in particular.

The mount 11 defines a depression or channel 13 between two flanges 15 and 16 and above a thin bottom 18. The magnetic recording medium 12 is disposed in such depression or channel. If desired, the medium 12 may be deposited directly on the bottom 18, rather than on a plastic tape or sheet as usual.

As is well known in the thermomagnetic recording art, thermomagnetic magnetization techniques, which have for instance been described in C, D. Mee, THE PHYSICS OF MAGNETIC RECORDING, (North-Holland Publishing Co., 1964). pp. 80 to 84 and are capable of providing a significantly stronger magnetization that magnetizations attainable with magnetic recording styli or even with anhysteretic recording techniques or selective demagnetization processes.

Figure 3:
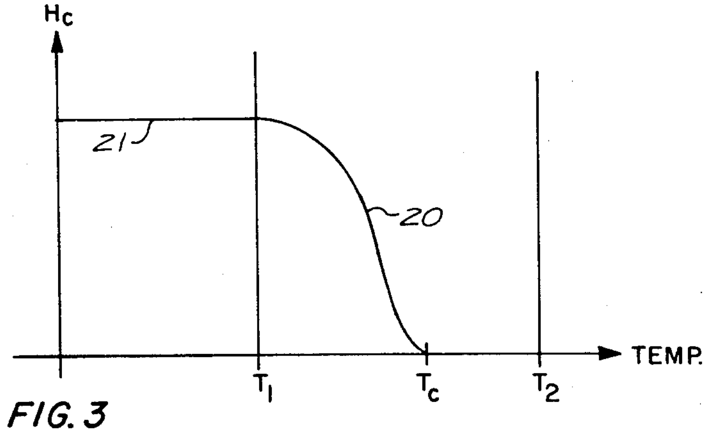
FIG. 3 is a graph plotting the coercivity of a thermomagnetic recording medium against its temperature.

A preferred species of thermomagnetic magnetization technique is graphically illustrated in FIG. 3. Briefly, a magnetic recording medium having a Curie point $T^c$ is heated from a temperature $T_1$ that is preferably below the acutely declining region 20 of its coercivity curve 21 to a temperature $T^2$ above the Curie point $T^c$. The heated recording medium is thereupon cooled through the Curie point region and preferably back to the temperature $T^1$ in the presence of a magnetic field. The thermomagnetic magnetization produced in the medium during this cooling cycle typically is of a higher intensity than the magnetic field to which the medium is exposed during the cooling cycle.

The recording oscillograph 10 of FIGS. 1 and 2 exploits this principle as follows:

A galvanometer mirror 23 projects an intensive beam of light 24 onto the magnetic recording medium 12. The mirror 23 is deflected by a mirror drive 26 about an axis 27 in proportion to variations in an input signal received at terminals 28. The beam 24 has the purpose of heating the medium 12 from the temperature $T_1$ to the temperature $T_2$ (see FIG. 3) at the points at which it impringes on the medium 12.

Figure 2:
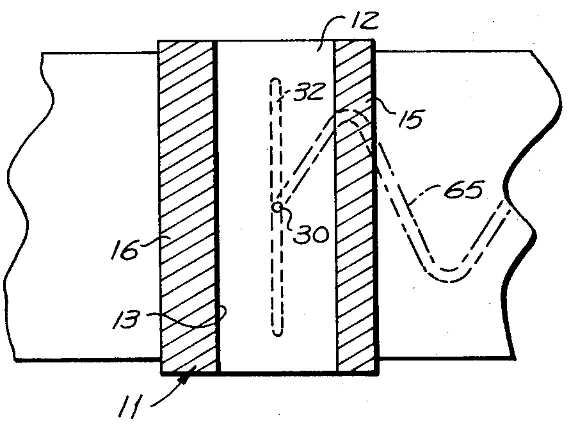
FIG. 2 is a view along the lines II—II of FIG. 1.

The small region of the recording medium 12 which is heated by the beam 24 is schematically indicated in FIGS. 1 and 2 at 30. It is to be understood at this juncture that no magnetization of the medium 12 takes place as a result of the impingement of the beam 24 as such. However, a variation of the input signal received at terminals 28 will cause a deviation of the mirror 23 so that the beam 24 is moved away from the region 30 in order to heat another region of the medium 24 to the above-mentioned temperature $t_2$. Deviation trajectories of the location of beam impingement are indicated by the dotted outline 32 in FIG. 2.

Once the beam 24 has moved away from the region 30, such region 30 is able to cool back to the temperature $T_1$ since it is not receiving further thermal energy from the beam 24. It will be noted from FIG. 3 that a cooling from the temperature $T_2$ to the temperature $T_1$ involves a cooling cycle through the Curie point $T_c$ and adjacent temperature regions. A magnet structure 34 provides a magnetic field H which is represented by the arrow 36 and which provides the requisite external magnetization for a thermomagnetic magnetization of the medium 12 during the cooling cycle from temperature $T_2$ to temperature $T_1$.

The result of such magnetization is a magnetic spot 38 which includes a magnetic gradient or magnetic gradients that permeate the mount bottom 18 and adjacent areas and that can be printed out on a web or sheet of paper 40, as will be more fully described below.

As the beam 24 is caused to travel along the trajectory 32 successive portions of the medium 12 along such trajectory are magnetized by thermomagnetic magnetization effected in the manner just described. Without more, this would provide a magnetized trace of the information along the medium 12. That, however, would be undesirable since the resulting printout would provide a graphically represented area (two-dimensional), rather than an information trace (one-dimensional) on the moving paper 40. What is desired on the medium 12 is a traveling magnetic spot, rather than an extended magnetic trace.

The realization of such a spot 38 is effected by having the magnet coil 34 periodically provide a magnetic erasing field H′ represented by the wave arrow 42. The erasing field H′ has the purpose of continuously erasing the magnetization of successive portions of the medium 12 as the beam 24 travels along the trajectory 32.

To this end, two electric energization sources 44 and 45 are provided. The source 44 supplies an electric energizing current, such as a direct current, for the magnet coil 34 which causes the provision of the magnetic field H, represented by the arrow 36, when the coil 34 is connected to the source 44 by the switch 47. In contrast thereto, the source 45 provides an electric erasing current, such as a pulsed anhysteretically decaying alternating current, which causes the provision of the magnetic erasing field H′, represented by the arrow 42, when the switch 47 connects the magnet coil 34 to the source 45.

A drive 48 for the switch 47 effects alternative connection of the sources 44 and 45 to the coil 34 so that each magnetic spot formed upon deviation of the light beam 24 is erased as rapidly as possible upon a printout thereof on the oscillograph paper 40. The rate of alternation of the sources 44 and 45 is preferably related to the rate of variation of the signal received at input terminals 28. Accordingly, a differentiator 50 is connected to the drive 26 in order to differentiate the input signal received thereby. The differentiated input signal is amplified in a power amplifier 51 which provides an energization current for a lamp 52 and also an energization current for the drive 48. The energization currents just mentioned are adjustable by variable resistors 54 and 55.

The switch drive 48 responds to the energization current received from the power amplifier 51 by controlling the rate of alternation of the sources 44 and 45 in proportion to the rate of variation of the input signal received at the terminals 28. It should, of course, be understood in this connection that the switch 47 and drive 48 may be provided by conventional electronic switching means which have their switching rate controlled in response to a variable input signal provided by the amplifier 51.

The provision of light beam 24 will now more specifically be considered. A conventional lamp 52 and lens system 57 cooperate in providing the beam 24 which is selected by the galvanometer mirror 23 as mentioned above. In principle, the lamp 52 could be energized from a conventional current source. However, overheating of the medium 12 is more readily avoided if the lamp 52 is energized by the power amplifier 51.

As mentioned above, this power amplifier provides an energization current which is proportional to the rate of variation of the input signal. If this rate is very rapid, it is desirable to increase the intensity of the beam 24 so as to make that successive portions of the medium 12 are still heated to the temperature $T_2$ despite of the rapid travel of the beam. To avoid damage to the medium 12, a lower beam intensity is however provided if the beam 24 travels only slowly or is in a standby position. In a similar manner, the rapidity of erasure of the magnetic spot 38 should be higher if the beam 25 travels faster, than if such beam is deflected at a lower rate. Accordingly, both the lamp 52 and the switch drive 48 are preferably energized from the power amplifier 51 as described.

To reduce the energy requirements of the beam 24, it may be preferable to preheat the medium 12 to the temperature $T_1$ or to a temperature in the vicinity thereof. A heating element 59 is schematically shown as being embedded in the mount 11 for this preheating purpose.

It will now be recognized that the oscillograph 10 of FIGS. 1 and 2 provides on the recording medium 12 a traveling magnetic spot rather than an extended trace.

A paper drive 60 rotates a capstan 61 for moving the paper web 40 in the direction of the arrow 62, so that the sheet 40 moves relative to the stationary mount 11 and along the bottom 18 thereof. A toner printout apparatus 64 is employed to effect a printout of the magnetic spot 38 onto the paper 40 so as to provide thereon an oscillograph trace 65 which represents variations of the signal received at the input terminals 28. Suitable printout apparatus are known in the art of magnetic printing. By way of example, U.S. Pat. No. 2,932,278, Single Print Magnetic Printer, J. C. Sims, Jr., issued Apr. 12, 1960, discloses a printer in which magnetic toner particles are used to print out magnetically recorded information. If desired, the magnetic particles may be encapsulated in fusible shells and heat may be employed to fuse these particles to the oscillograph paper 40 to provide a durable oscillogram.

Figure 4:
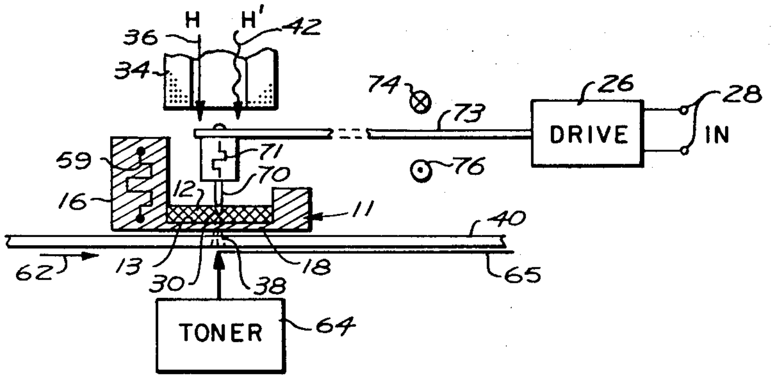
FIG. 4 illustrates a modification of the apparatus of FIG. 1.

A modification of the apparatus shown in FIG. 1 is illustrated in FIG. 4 in which like reference numerals as among FIGS. 1 and 4 are employed to illustrate like or functionally equivalent parts.

According to FIG. 4 a stylus 70 is employed in lieu of the light beam 24 of FIG. 1. This stylus is in contact with the magnetic recording medium 12 and is heated so as to elevate the temperature of the region 30 it contacts to the temperature $T_2$ above the Curie point $T_c$ of the recording medium 12. A heating element 71 is diagrammatically shown to indicate a means for heating the stylus 70. The element 71 may be an electric heating element which is connected to a source of electrical energy (not shown).

The style 70 and heating element 71 are mounted by an arm 73 which, in response to variations of an input signal received at the terminals 28, is oscillated by the drive 26 in the directions of the arrows 75 and 76.

Successive portions of the medium 12 are magnetized as the heated stylus 70 travels across the medium 12. Such magnetization of successive medium portions comes about as portions cool from the temperature $T_2$ to the temperature $T_1$ in the presence of the magnetic field H represented by the arrow 36 as the stylus 70 moves away from a portion previously heated thereby. As before, the magnetic erasing field H′ represented by the arrow 36 to provide for a continuous erasure of printed out magnetic spots 38. In this manner, no magnetic trace is formed on the medium 12. Rather, a magnetic spot 38 travels thereacross in a manner indicative of the input information received at terminals 28.

This traveling magnetic spot is printed out in the above-mentioned manner to form an oscillograph trace 65. The remainder of the system of the embodiment of FIG. 4 may be the same as that illustrated in FIGS. 1 and 2.

Figure 5:
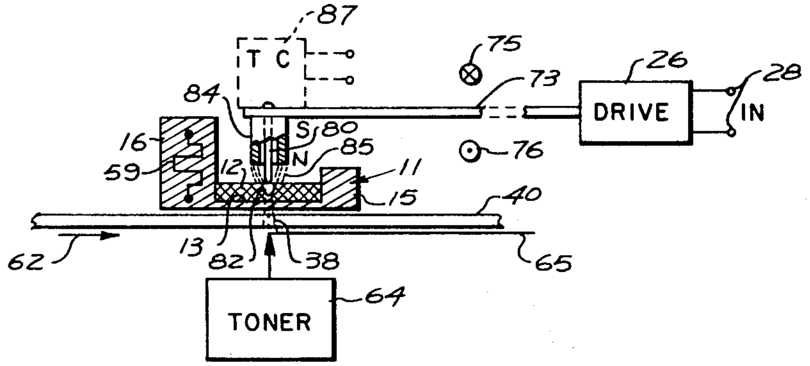
FIG. 5 illustrates essential parts of a recording oscillograph in accordance with a further preferred embodiment of the invention.

A different approach is illustrated in FIG. 5, although the embodiment shown in FIG. 5 may in a sense be viewed as a modification of the embodiment shown in FIGS. 1 and 2 or of the embodiment shown in FIG. 4. Accordingly, like reference numerals as among FIGS. 1, 2, 4 and 5 are employed to designate like or functionally equivalent parts.

In the embodiment of FIG. 5 the heating element 59 represents a means for heating the magnetic recording medium 12 to the temperature $T_2$ above the Curie point $T_c$. A stylus 80 in contact with the medium 12 is thereupon employed to cool successive portions of the medium 12 to the temperature $T_1$ below the Curie point $T_c$ and preferably below the acute portion 20 of the coercivity curve 21 of the medium 12 (see FIG. 3). An example of a cooled portion of the medium 12 is shown at 82 in FIG. 5. The locations of the subsequently cooled portions of the medium 12 are selected in response to the input information received at the terminals 28. To this end, a drive 26 of the above-mentioned type moves the arm 73 on which the stylus 80 is mounted.

A magnetized sleeve 84 is disposed about the stylus 80 and mounted on the arm 73, and serves to provide the magnetic field 85 which is requisite for thermoremanent magnetization.

It will now be appreciated that the traveling cooling stylus 80 subjects successive portions of the recording medium 12 to a cooling cycle through the Curie point region. Since each cooling cycle takes place in the presence of the magnetic field 85, thermoremanent magnetization of successive portions of the medium 12 takes place. The resulting magnetic spots 38 are continuously printed out with magnetic toner on the moving oscillograph paper 40 so that the desired oscillograph trace 65 is generated in response to the input information.

If desired or necessary, a thermocouple 87 or other cooling means may be combined with the style 80 in order to promote the desired cooling cycle.

Considering briefly the illustrated cooled region 82, it is easily seen that the temperature of this region will rise through the Curie temperature $T_c$ and acquire the value $T_2$ as the cooling stylus 80 travels away from the illustrated region 82 while the heating element 59 continues to supply heat energy to the medium 12. In a similar manner, all subsequently magnetized regions will experience a similar raise in temperature. Since the Curie point is the transition of a normally ferromagnetic material to a paramagnetic state, it is further seen that the magnetization of successive portions of the recording medium 12 will be automatically erased by above-Curie point heating as the stylus 80 travels across the recording medium 12.

It will now be recognized that the embodiment of FIG. 5 again avoids the provision of a magnetic track on the recording medium 12. Instead, this embodiment, like the previously discussed embodiments, provides a magnetic spot that travels across the medium 12 and that can be easily printed out to provide the magnetic oscillograph trace. Those familiar with my above-mentioned copending U.S. Pat. application Ser. No. 821,232 will realize that the embodiment of FIG. 5 is also closely related to the information-controlled cooling concept disclosed in that application. According to the embodiment of FIG. 5 the desired information control of the cooling cycle is effected by controlling the location at which such cooling cycle takes place.

In some respects, the embodiment of FIG. 5 displays substantial advantages over the previously discussed embodiments. For instance, the energizing sources 44 and 45 and the equipment for alternating the same are not required in the embodiment of FIG. 5. Also, the permanent magnet sleeve 84 shown in FIG. 5 may be employed in lieu of the magnet coil 34.

If desired the medium 12 described and shown herein may be a magnetic material of the type shown in U.S. Pat. No. 3,126,492, Ferromagnetic Energy Devices, by T. J. Swoboda, issued Mar. 24, 1964. As is apparent from that patent and from other literature on the subject, there are materials, such as certain antimonides, which display ferromagnetic or ferrimagnetic properties within a predetermined temperature range and which are practically paramagnetic outside that range. By way of example, the latter Swoboda patent illustrates several manganese-chromium-indium antimonides, such as one having the formula of $Mn_{7.6}Cr_{0.4}In_{1.0}Sb_{3.0}$, which display the latter ferro (or ferri) magnetic-to-paramagnetic transitions.

In practical terms, a "Swoboda material" of the type under discussion may be used as the medium 12 in FIG. 3. The heater 59 is then adjusted to raise the temperature of the medium 12 to a range adjacent to but above the upper ferro-to-para transition of the medium 12. The cooling stylus 80, in turn, is employed to cool the medium 12, at the regions 82 it contacts, to a temperature range which is below the upper ferro-to-para transition and at which the medium 12 is ferromagnetic.

The magnetic field 85 established by the magnet structure 84 or, if desired, by an electrically energized magnet coil of the type shown at 34 in FIG. 1, magnetizes the subsequently cooled and ferromagnetic regions 82 to provide a series of magnetized spots 38 which in their trajectories of evolution represent the input information received at terminals 28 of the stylus drive 26, and which are continuously printed out on the moving paper 40 to provide the oscillograph trace 65.

As before, the magnetic spot 38 does not evolve into a trace across the medium 12. Rather, the magnetic spot 38 remains a spot as it travels across the medium 12. This comes about because of the fact that the cooling by the stylus 80 as to any region 82 ceases as soon as the stylus leaves such region. The magnetization of such region is thus automatically erased upon a printout thereof, as the heater 59 raises the temperature of such region to a range above the aforesaid upper ferro-to-para transition.

It will at this juncture be appreciated that "Swoboda material" may also be used in the embodiments of FIGS. 1, 2 and 4. In that case, the medium 12 is kept at a temperature below the lower para-to-ferro transition (standing for "paramagnetic-to-ferromagnetic" or "paramagnetic-to-ferromagnetic") of the medium 12. The galvanometer-deflected beam 24 of FIGS. 1 and 2, or the heater stylus 70 of FIG. 4, is then used to heat successive regions 30 to a temperature within the ferro or ferrimagnetic range of the medium 12.

In this manner, a succession of magnetic spots 38 is formed as before. These spots are continuously printed out to provide the oscillograph trace 65 on the moving paper sheet 40. Moreover, these spots are continuously erased upon printout thereof, since each heated region 30 reverts to a temperature in the paramagnetic range of the medium 12 as the beam 24 or stylus 70 is deflected from such region. It is for this reason that the erasing current source 45 and switch drive 48 are omitted if a "Swoboda material" is used as the medium 12 in the embodiments of FIGS. 1 and 2 or 4.

I claim: While specific embodiments have been discussed and illustrated herein, modifications and variations within the spirit and scope of the invention will be apparent or suggest themselves to those skilled in the art.

1. In a method of displaying information, the steps of providing a magnetic recording medium, producing in said magnetic recording medium a magnetic spot having a substantially predetermined configuration, varying in response to said information and in said magnetic recording medium the location of said magnetic spot having substantially said predetermined configuration, and rendering said variations of the magnetic spot locations visible.

2. A method as claimed in claim 1, wherein said magnetic spot is printed out on a print-supporting medium to establish a record of said information.

3. A method as claimed in claim 1, wherein the location of said magnetic spot is varied substantially in a predetermined plane, and wherein said magnetic spot is continuously printed out on a print-supporting medium advanced at an angle to said predetermined plane.

4. A method as claimed in claim 1, wherein said magnetic spot is produced and its location varied by magnetizing successive portions of said magnetic recording medium, and by subsequently demagnetizing said successive portions so that said magnetic spot appears to travel along said successive portions.

5. A method as claimed in claim 4, wherein said successive portions are magnetized by subjecting said successive portions to a transition from a nonmagnetic to a magnetic state.

6. A method as claimed in claim 5, wherein said transition is thermally induced.

7. A method as claimed in claim 5, wherein said successive portions are demagnetized by subjecting said successive portions to a transition from a magnetic to a nonmagnetic state.

8. A method as claimed in claim 7, wherein said transition from a nonmagnetic to a magnetic state and said transition from a magnetic to a nonmagnetic state are thermally induced.

9. A method as claimed in claim 4, wherein said successive portions are magnetized by thermomagnetic magnetization.

10. A method as claimed in claim 9, wherein said successive portions are demagnetized by high-frequency erasing.

11. A method as claimed in claim 9, wherein said successive portions are demagnetized by above-Curie point heating.

12. A method as claimed in claim 4, wherein said magnetic recording medium undergoes a reversible transition from a substantially nonmagnetic to a magnetic state in response to a temperature variation, and wherein said successive portions are magnetized by effecting said transition in said successive portions and applying a magnetic field to said successive portions.

13. A method as claimed in claim 12, wherein said successive portions are demagnetized by reversing said transition in said successive portions.

14. In apparatus for recording information, the improvement comprising in combination:

a magnetic recording medium;

first means for producing in said magnetic recording medium a magnetic spot having a substantially predetermined configuration;

second means operatively associated with said first means for varying in response to said information and in said magnetic recording medium the location of said magnetic spot having substantially said predetermined configuration; and third means for rendering said variations of the magnetic spot visible.

15. Apparatus as claimed in claim 14, wherein said third means includes means for printing out said magnetic spot to establish a record of said information.

16. Apparatus as claimed in claim 14, wherein said second means is constructed to vary the location of said magnetic spot substantially in a predetermined plane, and said third means includes means for advancing a print-supporting medium at an angle to said predetermined plane and means for continuously printing out said magnetic spot on said print-supporting medium to establish a record of said information.

17. In apparatus for recording information, the improvement comprising in combination:

a stationary magnetic recording medium magnetizable by subjection to a heating cycle followed by a cooling cycle in the presence of a magnetic field;

means for applying a magnetic field to said recording medium;

means operatively associated with said recording medium for selecting successive portions of said recording medium in response to said information;

means operatively associated with said recording medium and said selecting means for subjecting said selected successive portions to said heating cycle and subsequently to said cooling cycle in the presence of said magnetic field to provide for a magnetization of said successive portions;

means for moving a print-receiving medium relative to said recording medium;

means for successively printing out said magnetization of said successive portions onto said print-receiving medium; and means operatively associated with said recording medium for demagnetizing said successive portions after each printout of the magnetization thereof.

18. Apparatus as claimed in claim 17, wherein said demagnetizing means include means for periodically applying an erasing field to said magnetic recording field.

19. Apparatus as claimed in claim 17, wherein said means for applying said magnetic field include a magnet coil located adjacent said recording medium and means connected to said magnet coil for periodically applying a first electric current to said magnet coil to provide for said magnetization of said successive portions, and wherein said demagnetizing means include means for periodically applying an electric erasing current to said magnet coil during intervals between applications of said first electric current.

20. In apparatus for recording information, the improvement comprising in combination:

a stationary magnetic recording medium magnetizable by subjection to heating followed by a cooling cycle in the presence of a magnetic field;

means operatively associated with said recording medium for effecting said heating;

means operatively associated with said recording medium for applying said magnetic field;

means operatively associated with said recording medium for selecting successive portions of said recording medium;

means operatively associated with said recording medium and said selecting means for subjecting said selected successive portions to said cooling cycle in the presence of said magnetic field to provide for a magnetization of said successive portions;

printout means for moving a printout-receiving medium relative to said recording medium; and means for successively printing out said magnetization of said successive portions onto said print-receiving medium;

with said heating means being constructed to supply heat energy to said recording medium to effect a demagnetization of each magnetized portion after printout thereof by said printout means.

21. Apparatus as claimed in claim 20, wherein said means for subjecting said selected successive portions to said cooling cycle include a cooled stylus.